Patented July 25, 1950

2,516,649

UNITED STATES PATENT OFFICE 2,516,649

UNSATURATED ORGANIC PEROXIDE AND METHOD OF MAKING SAME

Frederick F. Rust, Berkeley, and Frank H. Dickey, Los Angeles, Calif., assignors to Shell Development Company, San Francisco, Calif., a corporation of Delaware No Drawing. Application December 10, 1946, Serial No. 715,338

6 Claims. (Cl. 260—610)

The present invention relates to certain novel unsaturated organic peroxides and a novel process by which such peroxides may be manufactured. More particularly, the invention relates to novel peroxides in which one oxygen atom of the peroxy radical is directly linked to a carbon atom of tertiary character, while the other oxygen atom of the peroxy group is linked to an unsaturated organic radical, i. e. to an alkene or cycloalkene radical.

It has previously been discovered that metal salts of tertiary organic peroxides may be produced by reacting a tertiary organic hydroperoxide with a base (preferably a strong base) of an alkali metal or an alkaline earth metal. For instance, an alkali metal hydroxide, such as sodium or potassium hydroxide, may be reacted with a tertiary organic hydroperoxide, such as tertiary butyl hydroperoxide, to yield the alkali metal salt of the hydroperoxide, such as sodium or potassium tertiary-butyl peroxide. Similarly, bases of the alkaline earth metals, such as barium, calcium or strontium hydroxides, may be reacted with tertiary organic hydroperoxides to yield the corresponding alkaline earth metal salts of the hydroperoxide.

We have now discovered that the alkali metal or alkaline earth metal salts of the hydroperoxides may be reacted with unsaturated halides to produce compounds of the type, $R_1$—O—O—$R_2$, wherein $R_1$ is a tertiary organic radical and $R_2$ is an unsaturated aliphatic or cycloaliphatic radical. A typical example of such a reaction is the reaction between sodium tertiary-butyl peroxide and allyl bromide to yield allyl tertiary-butyl peroxide.

The compounds of the present invention are particularly useful as polymerization catalysts for the polymerization of unsaturated compounds, both of the non-conjugated type, such as diallyl phthalate, and the conjugated type, such as butadiene and the methylpentadienes. The compounds may be used for other purposes, such as the improvement of cetane values in Diesel engine fuels.

The metal salts which may be used in the process of the present invention are of the general formula, $M(—O—O—R)_n$, wherein M is a metal of the alkali metal series such as sodium, potassium, lithium, rubidium and caesium, or of the alkaline earth series such as calcium, strontium and barium, and $n$ is equal to one in the case of the alkali metal series and is equal to two in the alkaline earth series. In this formula, R represents a tertiary organic radical in which a tertiary carbon atom is directly linked to the peroxy group. The following are illustrative examples of such metal salts: sodium tertiary-butyl peroxide, potassium tertiary-butyl peroxide, calcium di-tertiary-butyl peroxide, sodium tertiary-amyl peroxide, potassium tertiary-amyl peroxide, sodium alpha,alpha-dimethylbenzyl peroxide, and the like. These peroxide salts may contain various organic and/or inorganic groups or radicals, such as aryl, alkyl or alicyclic radicals, as well as halogen atoms and the like, substituted for one or more of the hydrogen atoms on the various carbon atoms of the organic radical. Although it is ordinarily preferred to work with pure compounds, mixtures of any of the above may be used.

The alkene or cycloalkene halides which are suitable for reaction with the metal salts mentioned above include all of the halogen compounds of the alkene and cycloalkene series. Any halogen may be present such as chlorine, bromine, iodine or fluorine, although the first two are preferred. The halides may be primary, secondary or tertiary and preferably contain only a single halogen atom, although two or more halogen atoms may be present. As in the case of the metal salts, pure compounds are preferred although mixtures of the unsaturated halides may be utilized. The following are typical of the monohalogenated compounds which may be used: vinyl chloride, allyl bromide, crotyl chloride, 1-chloropentene-1, 1-chloro-2-methylbutene-1,1-bromo-3-methylbutene-1,1 - chlorohexene-1,2-bromoheptene-1 - iodooctene - 1, 1-chlorocyclohexene-1, 2-bromocyclooctene-1, and the like.

The reaction between the metal peroxide salt and the unsaturated organic halide is preferably carried out in the presence of a solvent in which the metal halide salts, which are formed as a by-product, are not appreciably soluble. It has been discovered that when the aforesaid reaction is conducted in the presence of such a solvent, the yields of the desired organic peroxide are much higher as compared to those obtained when the reaction is effected in the absence of a solvent. Besides the better yields obtained, another advantage of employing a solvent having the above characteristics is that it provides a ready means for separating the metal halide salt. Thus, after the reaction has been completed, the salt may be filtered from the reaction mixture or may be removed therefrom by water-washing. This enables one to isolate the desired organic peroxide by distillation of the reaction mixture without the inherent difficulties of distilling a mixture containing salt, such as decomposition and caking of the salt on the heating surface of the still. Preferably, the solvent employed is one in which both of the reactants are soluble so that only a single liquid phase is obtained. Although the reaction may be carried out in a two-phase system, better results are generally obtained when only a single phase is present.

The solvent, in addition to being a solvent for the reactants and a non-solvent for the metal halide salt by-product, should be inert to the reaction. As examples of suitable solvents may be mentioned: isopropyl alcohol, normal propyl alcohol, normal butyl alcohol, secondary butyl alcohol, isobutyl alcohol, tertiary butyl alcohol, the amyl alcohols, acetone methyl ethyl ketone, dioxane, 2,5-dimethyl dioxane-1,4, 2,5-dimethyl dioxane-1,4-tetramethyl dioxane, and the like. Mixtures of such solvents may also be used.

The reaction between the metal peroxide salt and the unsaturated halide may be effected within a wide range of operating temperatures, the optimum temperature depending on a number of variables, e. g. the specific reactants employed, the presence or absence of a solvent, the nature of the solvent used, and the like. Generally, the temperature will vary from about room temperature, or somewhat below, to the initial boiling point of the reaction mixture. It is sometimes preferred to employ high operating temperatures, particularly where lower temperatures would prevent the presence of a single phase system. With the higher temperatures it may be desirable to employ superatmospheric pressures in order to keep the reaction products and solvent substantially in the liquid phase. The amount of solvent, if any, which may be employed is not critical and may be from about 10% to 50% based on the volume of the total reaction mixture. Upon the completion of the reaction, the metal halide salt may be removed from the reaction mixture by filtration, washing, decantation, centrifugation, etc. The organic peroxide may be then recovered from the remaining organic phase, preferably by distillation.

The following non-limiting examples illustrate the present invention:

*Example I.—Allyl tertiary-butyl peroxide*

Three hundred milliliters of a solution of potassium tertiary-butyl peroxide in isopropyl alcohol containing 0.34 moles of active oxygen was treated at ice temperature with 0.35 moles of ally bromide. After five days the reaction mixture was washed with water and about 10 grams of allyl tertiary butyl-peroxide was isolated.

Allyl tertiary-butyl peroxide was identified by means of the following data.

| | Found | Theory |
|---|---|---|
| Per Cent Carbon | 62.8 | 64.6 |
| Per Cent Hydrogen | 11.0 | 10.7 |
| Molecular Weight (cryo., benzene) | 129 | 130 |

*Example II.—Allyl tertiary butyl-peroxide*

One hundred and fifty milliliters of a solution of about 0.2 mole of potassium tertiary-butyl peroxide in isopropyl alcohol was treated at ice temperature with 0.18 mole of allyl chloride. After six days the reaction was stopped and 4 grams of allyl tertiary-butyl peroxide was isolated.

*Example III.—Allyl alpha,alpha-dimethylbenzyl peroxide*

A solution of 0.065 mole of sodium alpha,alpha-dimethylbenzyl peroxide in 100 milliliters of isopropyl alcohol was treated at 20° C. with 0.06 mole of allyl bromide. After seven days the reaction was stopped and 4 grams of allyl alpha,-alpha-dimethylbenzyl peroxide was isolated.

Allyl alpha,alpha-dimethylbenzyl peroxide was identified by means of the following data:

| | Found | Theory |
|---|---|---|
| Per Cent Carbon | 74.8 | 75.0 |
| Per Cent Hydrogen | 8.5 | 8.3 |
| Molecular Weight (cryo., benzene) | 190 | 192 |

*Example IV.—Allyl tertiary-amyl peroxide*

A suspension of 0.12 mole of sodium tertiary-amyl peroxide in isopropyl alcohol was treated at zero degrees with 0.12 mole of allyl bromide. After two days the reaction was stopped and 5.5 grams of allyl tertiary-amyl peroxide was isolated.

Allyl tertiary-amyl peroxide was identified by means of the following data:

| | Found | Theory |
|---|---|---|
| Per Cent Carbon | 10.8, 10.8 | 10.8 |
| Per Cent Hydrogen | 63.7, 63.7 | 64.6 |

*Example V.—Methallyl tertiary-butyl peroxide*

A solution of 1.2 moles of potassium tertiary-butyl peroxide in 750 ml. of isopropyl alcohol was treated at zero degrees with 0.95 mole of methallyl bromide. After standing overnight the reaction was stopped and 0.32 grams of methallyl tertiary-butyl peroxide was isolated; this colorless, mobile liquid gave positive response to characteristic tests for organic peroxides of this type.

In like manner, other salts of tertiary organic peroxides may be reacted with other unsaturated organic peroxides to produce additional unsaturated peroxides. For example, the substances listed below may be reacted with each other to produce the organic peroxides listed.

| Reactants | Organic Peroxide |
|---|---|
| Potassium tertiary-butyl peroxide and crotyl chloride. | Teritary-butyl crotyl peroxide. |
| Sodium tertiary-amyl peroxide and vinyl chloride. | Tertiary-butyl vinyl peroxide. |

We claim as our invention:

1. An organic peroxide having the general formula:

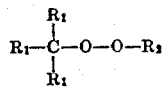

wherein each $R_1$ is an organic radical and $R_2$ is an organic radical chosen from the group consisting of alkene and cycloalkene radicals.

2. An organic peroxide having the general formula:

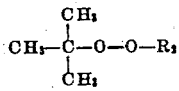

in which $R_2$ is an alkene radical.

3. As a new organic compound: allyl tertiary-butyl peroxide.

4. As a new organic compound: methallyl tertiary-butyl peroxide.

5. As a new organic compound: allyl alpha, alpha-dimethylbenzyl peroxide.

6. An organic peroxide having the general formula:

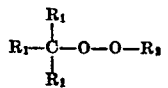

wherein $R_1$ is an alkane radical and $R_2$ is an alkene radical.

FREDERICK F. RUST.
FRANK H. DICKEY.

REFERENCES CITED

The following references are of record in the file of this patent:

UNITED STATES PATENTS

| Number | Name | Date |
|---|---|---|
| 1,793,917 | Faber | Feb. 24, 1931 |
| 2,379,390 | Tuerck | June 26, 1945 |
| 2,381,561 | Staudinger et al. | Aug. 7, 1945 |
| 2,400,041 | Dickey | May 7, 1946 |
| 2,403,709 | Dickey et al. | July 9, 1946 |
| 2,409,996 | Roedel | Oct. 22, 1946 |